US011602985B2

(12) United States Patent
Weston et al.

(10) Patent No.: US 11,602,985 B2
(45) Date of Patent: Mar. 14, 2023

(54) CONTINUOUS COOLING ASSEMBLY

(71) Applicant: Ford Global Technologies, LLC, Dearborn, MI (US)

(72) Inventors: Keith Weston, Canton, MI (US); Matthew Arthur Titus, Livonia, MI (US); Trenton Lee Mcmillion, Roseville, MI (US); Ryan Orourke, Dearborn, MI (US); Joshua Walters, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 16/568,097

(22) Filed: Sep. 11, 2019

(65) Prior Publication Data

US 2021/0070131 A1     Mar. 11, 2021

(51) Int. Cl.
| | |
|---|---|
| *B60H 1/00* | (2006.01) |
| *B60K 11/08* | (2006.01) |
| *B60K 11/04* | (2006.01) |
| B60H 3/06 | (2006.01) |
| F28D 1/02 | (2006.01) |
| F28D 21/00 | (2006.01) |
| F28D 1/00 | (2006.01) |

(52) U.S. Cl.
CPC .......... *B60K 11/08* (2013.01); *B60H 1/00042* (2013.01); *B60H 2003/0666* (2013.01); *B60K 11/04* (2013.01); *F28D 1/00* (2013.01); *F28D 2001/0266* (2013.01); *F28D 2021/0091* (2013.01)

(58) Field of Classification Search
CPC ........ B60H 1/00042; B60H 2003/0666; B60K 11/04; B60K 11/08; B60T 5/00; F28D 1/00; F28D 2001/0266; F28D 2001/0273; F28D 2021/0091
See application file for complete search history.

(56) References Cited

U.S. PATENT DOCUMENTS

| | | | | |
|---|---|---|---|---|
| 2,136,472 | A * | 11/1938 | Sinclair | B60T 5/00 188/264 R |
| 2,811,023 | A * | 10/1957 | Lathrop | F24F 13/224 62/280 |
| 3,174,539 | A * | 3/1965 | Pietsch | F24F 1/0323 165/76 |
| 3,301,003 | A * | 1/1967 | Laing | F24F 1/027 62/324.5 |
| 4,673,206 | A * | 6/1987 | Kretschmer | B60K 11/08 296/180.1 |

(Continued)

FOREIGN PATENT DOCUMENTS

DE    102014207347 A1    10/2015

*Primary Examiner* — Eric S Ruppert
*Assistant Examiner* — Hans R Weiland
(74) *Attorney, Agent, or Firm* — Vincent Mastrogiacomo; McCoy Russell LLP (57) ABSTRACT

Methods and systems are provided for a cooling assembly for a vehicle. In one example, the cooling assembly may be a non-rectangular cooler positioned in a front end of the vehicle with an entry duct continuous with the non-rectangular cooler and arranged upstream of the non-rectangular cooler and an exit duct also continuous with the non-rectangular cooler and arranged downstream of the non-rectangular cooler.

20 Claims, 7 Drawing Sheets

(56) References Cited

U.S. PATENT DOCUMENTS

| | | | | |
|---|---|---|---|---|
| 4,805,747 A * | 2/1989 | Moedinger | ............... | B60T 5/00 |
| | | | | 188/264 A |
| 7,523,798 B2 | 4/2009 | Muramatsu et al. | | |
| 9,163,685 B2 * | 10/2015 | Carmassi | ................. | B60T 5/00 |
| 9,694,858 B2 * | 7/2017 | Wolf | ...................... | B60K 11/04 |
| 2002/0144808 A1 * | 10/2002 | Jones | .................... | F28F 21/067 |
| | | | | 165/173 |
| 2003/0168270 A1 * | 9/2003 | Maeda | .................. | B60K 11/04 |
| | | | | 180/68.4 |
| 2007/0023238 A1 * | 2/2007 | Ramsay | ................... | B60T 5/00 |
| | | | | 188/71.6 |
| 2012/0068498 A1 * | 3/2012 | Wolf | ........................ | B60T 5/00 |
| | | | | 296/193.1 |
| 2012/0308214 A1 * | 12/2012 | Tyburk | ................... | F24F 13/20 |
| | | | | 392/407 |
| 2012/0318476 A1 * | 12/2012 | Begleiter | ............ | B60K 11/085 |
| | | | | 165/51 |
| 2015/0338167 A1 * | 11/2015 | Pomin | .................... | F28F 1/128 |
| | | | | 165/151 |
| 2016/0108814 A1 * | 4/2016 | Schmitz | ................. | B23P 15/26 |
| | | | | 60/39.511 |
| 2017/0144533 A1 * | 5/2017 | Gilotte | ..................... | B60T 5/00 |
| 2018/0038651 A1 | 2/2018 | Tonellato et al. | | |
| 2018/0056909 A1 * | 3/2018 | Sedique | ................. | B60R 19/50 |
| 2018/0119762 A1 * | 5/2018 | Smith | ...................... | B60T 5/00 |
| 2018/0187984 A1 * | 7/2018 | Manzo | ...................... | F28F 7/02 |
| 2018/0264931 A1 * | 9/2018 | Chae | ........................ | B60T 5/00 |
| 2018/0340735 A1 * | 11/2018 | Takaishi | ................ | B60K 11/04 |
| 2018/0347909 A1 * | 12/2018 | Shimota | ................ | B60K 11/08 |
| 2020/0139933 A1 * | 5/2020 | Mullen | ............. | B60H 1/00564 |
| 2020/0263932 A1 * | 8/2020 | Hatfield | .................... | F28D 9/00 |
| 2020/0361540 A1 * | 11/2020 | Grattan | ................ | B62D 21/155 |
| 2020/0407042 A1 * | 12/2020 | Ahlstrom | ............. | B64C 25/001 |

* cited by examiner

CONTINUOUS COOLING ASSEMBLY

FIELD

The present description relates generally to methods and systems for cooling vehicle components.

BACKGROUND/SUMMARY

A vehicle may have multiple heat exchanger assemblies positioned in various locations of the vehicle to reduce a temperature of vehicle components. For example, the heat exchanger assemblies may include a plurality of grilles arranged along a front end of the vehicle to direct air flow through and around the vehicle. The plurality of grilles may be positioned to target specific vehicle components, such an engine, brakes, a transmission, differentials, etc., with each grille of the plurality of grilles guiding incoming air to flow across a heat exchanger positioned downstream of each grille and upstream of a vehicle component. The incoming air is thus cooled via heat exchange with the heat exchangers and in turn, absorbs heat from the downstream vehicle component as the air contacts the component, thereby reducing a temperature of the vehicle component and prolonging its useful lifetime.

However, the inventors herein have recognized potential issues with such systems. As one example, the heat exchangers may be coupled to the plurality of grilles and to the vehicle components by ducts and secured in place by brackets, adding to a complexity, weight, and cost of the heat exchanger assemblies. Furthermore, a rectangular shape of the heat exchangers, as demanded by conventional manufacturing methods, may result in poor cooling efficiency. In addition, grille geometries configured to accommodate the rectangular heat exchangers may increase an amount of drag and lift imposed on the vehicle.

In one example, the issues described above may be at least partially addressed by a cooling system comprising a non-rectangular cooler positioned in a front end of the vehicle, an entry duct continuous with the non-rectangular cooler and arranged upstream of the non-rectangular cooler, and an exit duct also continuous with the non-rectangular cooler and arranged downstream of the non-rectangular cooler, wherein the non-rectangular cooler, the entry duct, and the exit duct form a continuous monolithic structure. In this way, a number of individual components of the cooling system may be reduced, thereby simplifying the assembly and allowing a geometry of the heating exchange assembly to be customized to enhance cooling efficiency.

As one example, the cooling system may include a cooling assembly formed as a single, monolithic, continuous component. The cooling assembly may include a grille, an inlet duct, a heat exchanger, and an outlet duct consolidated into one unit and fabricated via additive manufacturing. A geometry of the cooling assembly may be readily adapted to constraints imposed by packaging space within the vehicle, to a shape of the vehicle component to be cooled, or to a path of air flow within a specific region of the vehicle. As a result, costs associated with manufacturing, testing and assembly may be decreased while increasing cooling of the vehicle components.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2, and 5-7 are shown approximately to scale.

DETAILED DESCRIPTION

Figure 1:
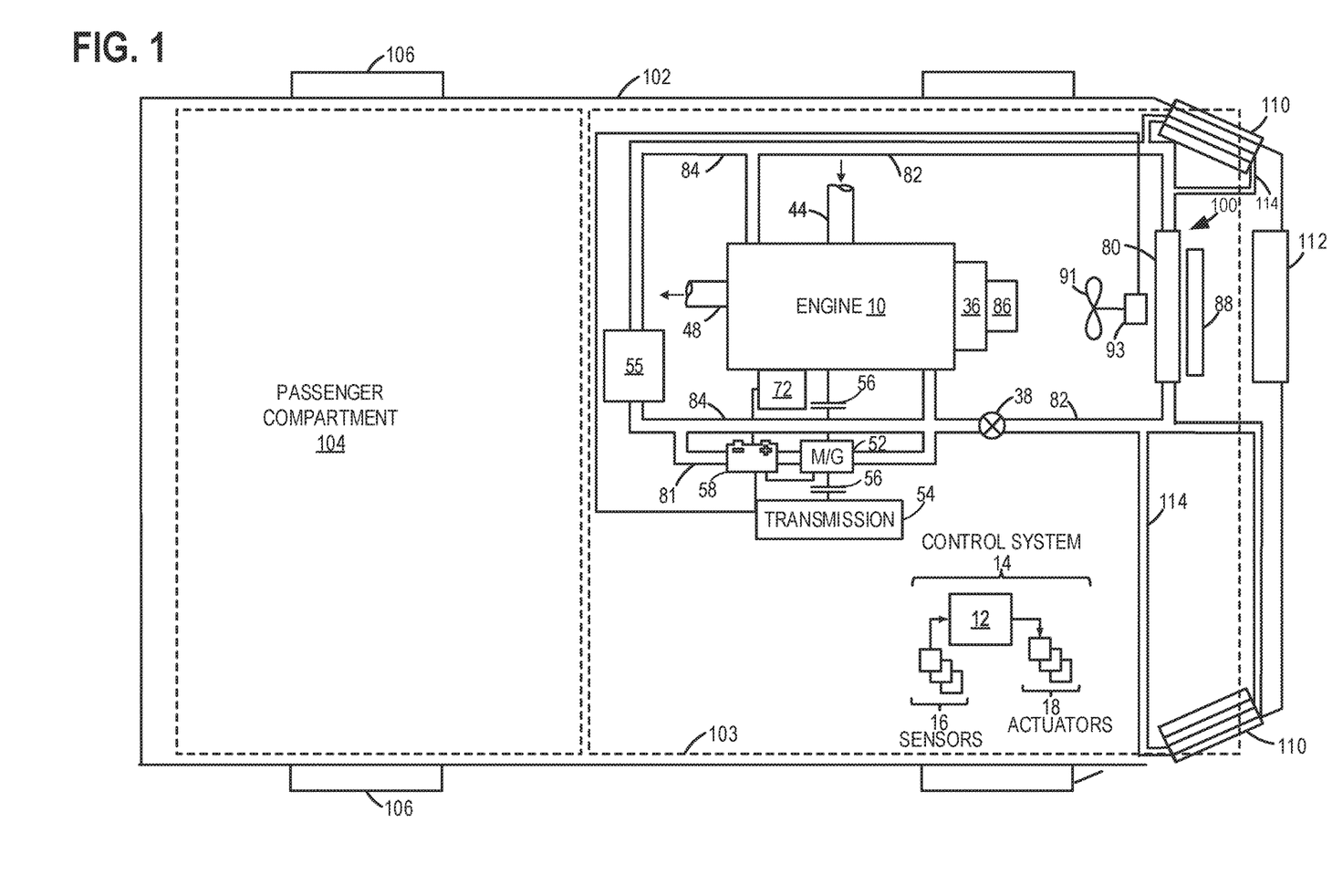
FIG. 1 shows a schematic diagram of an exemplary vehicle cooling system.
Figure 2:
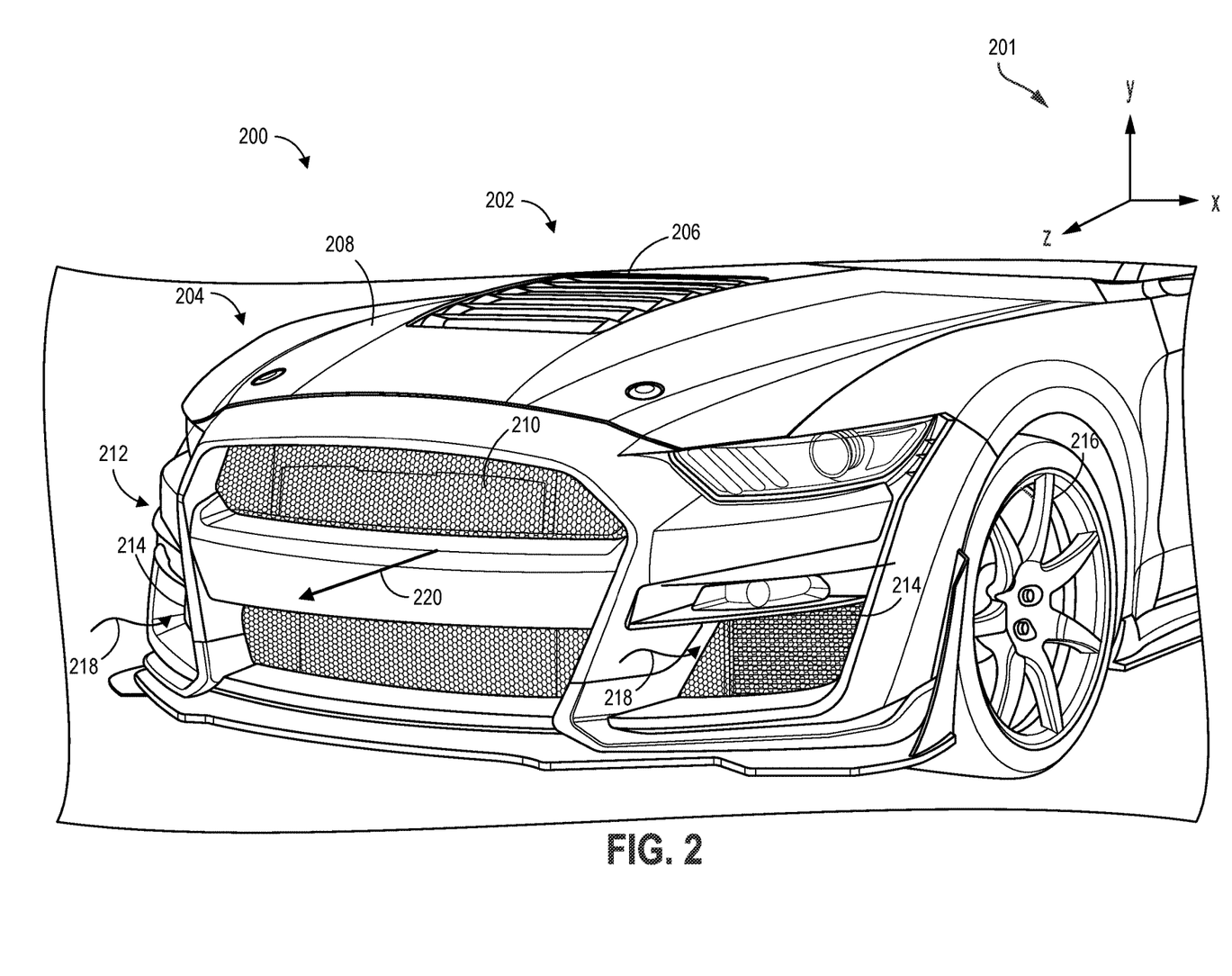
FIG. 2 shows an example of a front end of a vehicle in which a continuous cooling assembly may be arranged.
Figure 3:
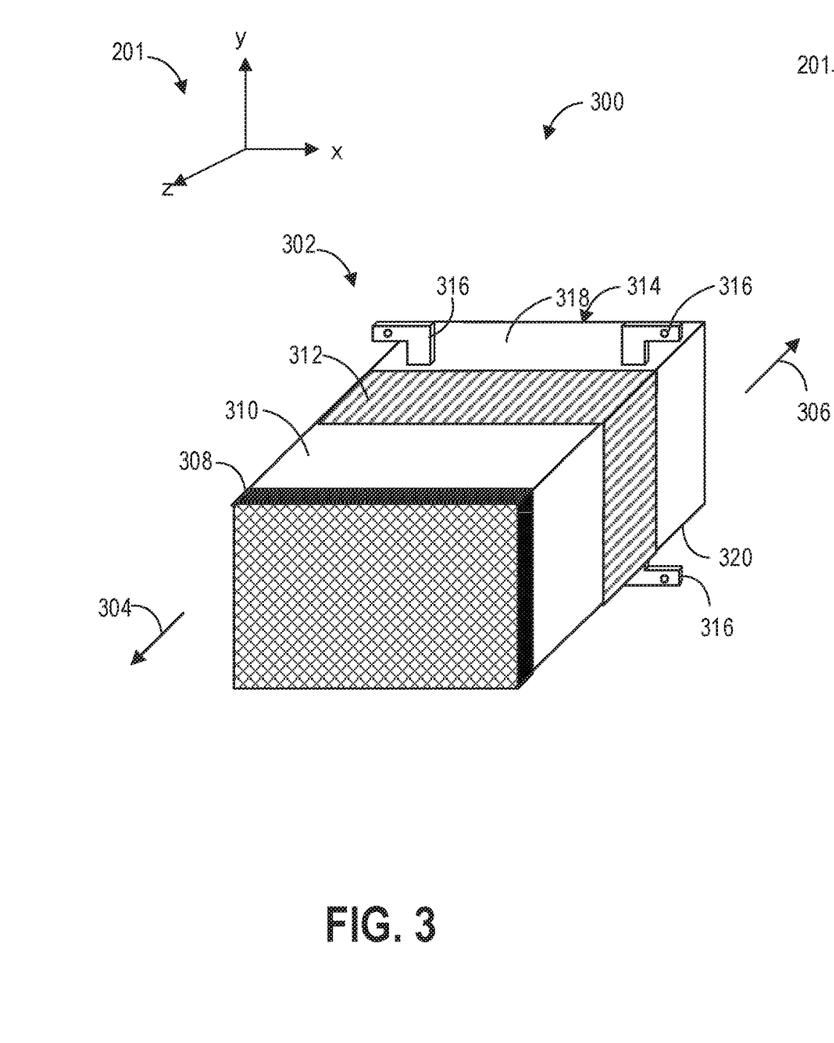
FIG. 3 shows a first, schematic example of a continuous cooling assembly from a perspective view.
Figure 4:
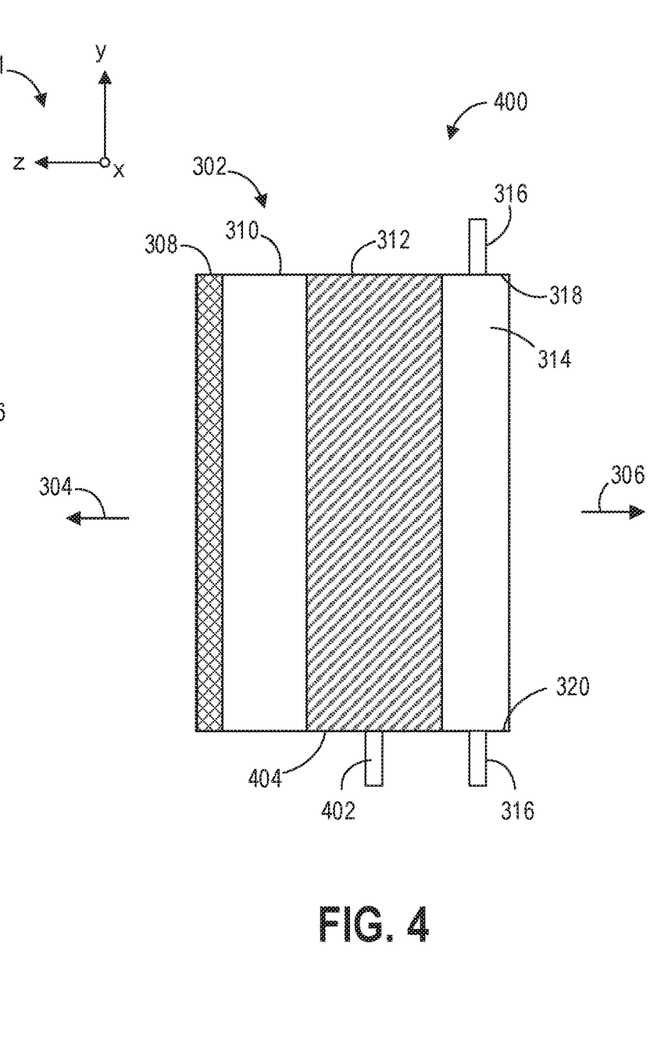
FIG. 4 shows a cross-section of the continuous cooling assembly of FIG. 3.

The following description relates to a cooling assembly for a vehicle. Cooling of vehicle components via heat exchangers may prolong a useful life of the components, reducing costs associated with maintenance and replacement of parts. For example, a heat exchanger, or cooler, may be arranged in a front end of a vehicle to cool a vehicle engine. An example of vehicle cooling system is depicted in FIG. 1, including a cooler relying on heat exchange with ambient air to cool the vehicle's engine. Heat exchangers may be arranged at various locations on the vehicle, including along a front fascia of the vehicle, as shown in FIG. 2. In order to improve a performance of the heat exchanger and reduce a complexity of a cooling assembly that incorporates the heat exchanger, the cooling assembly may be formed as a single, continuous unit. A schematic of a first example of a continuous cooling assembly is shown in FIGS. 3 and 4, illustrating positioning of cooling assembly components within the unit. A second example of the cooling assembly is shown relative to a wheel liner of a vehicle in FIGS. 5-7. In one example, the cooling assembly may be fabricated via additive manufacturing, thereby reducing a production cost of the continuous cooling assembly. Fabrication of the cooling assembly by additive manufacturing may allow the heat exchanger of the cooling assembly to have a variety of geometries that deviate from a conventional rectangular shape. Examples of such geometries are shown in FIG. 8.

FIGS. 2-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Operation of a vehicle for prolonged periods of times or at high speeds may lead to heating of vehicle components. For example, an engine, a transmission, brakes, differentials, etc., may be subject to high temperatures during vehicle operation, particularly in performance vehicles. To mitigate heating and reduce thermal degradation of the components, heat exchangers, or coolers, may be arranged in the vehicle to direct ram air flow across target components, thereby cooling the target components as the vehicle is driven. For example, a front end of the vehicle may include a plurality of grilles positioned along a front fascia and a hood of the vehicle, channeling intake air to coolers disposed downstream of the grilles and coupled to the grilles by ducts.

As one example, a heat exchanger may be a radiator included in an engine cooling system. A coolant may be circulated through the cooling system from the engine to the radiator, relying on air flowing across surface of the radiator to absorb heat from the coolant. The cooled coolant returns to engine to absorb heat from the engine. An example of an engine adapted with a radiator is shown in FIG. 1.

FIG. 1 is a schematic depiction of an example embodiment of a vehicle cooling system 100 in a motor vehicle 102. Vehicle 102 has wheels 106, a passenger compartment 104, and an under-hood compartment 103. Under-hood compartment 103 may house various under-hood components under the hood (not shown) of motor vehicle 102. For example, under-hood compartment 103 may house an internal combustion engine 10. Internal combustion engine 10 has a combustion chamber that may receive intake air via an intake passage 44 and may exhaust combustion gases via an exhaust passage 48. In one example, intake passage 44 may be configured as a ram-air intake, wherein the dynamic pressure created by moving vehicle 102 may be used to increase a static air pressure inside the engine's intake manifold. As such, this may allow a greater mass flow of air through the engine, thereby increasing engine power. Vehicle 102 as illustrated and described herein may be a road automobile, among other types of vehicles. While the example applications of engine 10 will be described with reference to vehicle 102, it should be appreciated that various types of engines and vehicle propulsion systems may be used, including passenger cars, trucks, etc.

In some examples, vehicle 102 may be a hybrid electric vehicle (HEV) with multiple sources of torque available to one or more of wheels 106. In other examples, vehicle 102 is a conventional vehicle with only an engine or an electric vehicle with only an electric machine(s). In the example shown, vehicle 102 includes engine 10 and an electric machine 52. Electric machine 52 may be a motor or a motor/generator. A crankshaft (not shown) of engine 10 and electric machine 52 are connected via transmission 54 to vehicle wheels 106 when one or more clutches 56 are engaged. In the depicted example, a first clutch 56 is provided between engine 10 (e.g., between the crankshaft of engine 10) and electric machine 52, and a second clutch 56 is provided between electric machine 52 and transmission 54. A controller 12 may send a signal to an actuator of each clutch 56 to engage or disengage the clutch, so as to connect or disconnect the crankshaft from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 106. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 72.

Under-hood compartment 103 may further include cooling system 100, which includes a radiator 80 and a condenser 88. Condenser 88 may be further coupled to an air conditioning (AC) system (not shown). Coolant is circulated through internal combustion engine 10 to absorb waste heat and distributes the heated coolant to the radiator 80 and/or a heater core 55 via coolant lines 82 and 84, respectively. In one example, as depicted, cooling system 100 may be coupled to engine 10 and may circulate engine coolant from engine 10 to radiator 80 via an engine-driven water pump 86 and back to engine 10 via coolant line 82. Engine-driven water pump 86 may be coupled to the engine via a front end accessory drive (FEAD) 36 and rotated proportionally to engine speed via a belt, chain, etc. Specifically, engine-driven pump 86 may circulate coolant through passages in the engine block, head, etc., to absorb engine heat, which is then transferred via radiator 80 to ambient air. In one example, where engine-driven water pump 86 is a centrifugal pump, the pressure (and resulting flow) produced by the pump may be proportional to the crankshaft speed, which in the example of FIG. 1, may be directly proportional to the engine speed. The temperature of the coolant may be regulated by a thermostat valve 38, located in cooling line 82, which may be kept closed until the coolant reaches a threshold temperature.

Coolant may flow through coolant line 82, as described above, and/or through coolant line 84 to heater core 55 where the heat may be transferred to passenger compartment 104 before the coolant flows back to engine 10. Coolant may additionally flow through a coolant line 81 and through one or more of electric machine (e.g., motor) 52 and system battery 58 to absorb heat from the one or more of electric machine 52 and system battery 58, particularly when vehicle 102 is an HEV or an electric vehicle. In some examples, engine-driven water pump 86 may operate to circulate the coolant through each of coolant lines 81, 82, and 84.

Furthermore, coolant may flow through various heat exchangers arranged upstream, e.g., relative to air flow through the vehicle 102 when the vehicle 102 is traveling forwards, of vehicle components that are subject to high temperature during vehicle operation. For example, continuous cooling assemblies 110 may be arranged at a front end of the vehicle 102. The continuous cooling assemblies 110 may be include grilles, similar to grille 112, disposed in an exterior surface of the vehicle 102. In one example, the continuous cooling assemblies 110 are positioned upstream of the wheels 106 (e.g., the front wheels 106) to direct ram-air through heat exchangers included in the continuous cooling assemblies 110. The heat exchangers may be fluidly coupled to cooling system 100 via additional coolant lines 114. The air is cooled via heat exchange with coolant flowing through the heat exchangers of the continuous cooling assemblies 110 and the cooled air absorbs heat from braking mechanisms implemented at the wheels 106. Examples of the continuous cooling assemblies 110 are described further below, with reference to FIGS. 3-7.

One or more blowers (not shown) and cooling fans may be included in cooling system 100 to provide airflow assistance and augment a cooling airflow through the under-hood components. For example, cooling fan 91 may be operated when the vehicle is moving and the engine is running to provide cooling airflow assistance through radiator 80. Cooling fan 91 may be coupled to battery-driven motor 93. Motor 93 may be driven using power drawn from system battery 58. Cooling fan 91 may draw a cooling airflow into under-hood compartment 103 through an opening in the front-end of vehicle 102, for example, through grille 112. Such a cooling airflow may then be utilized by radiator 80, condenser 88, and other under-hood components (e.g., fuel system components, batteries, etc.) to keep the engine and/or transmission cool. Further, the airflow may be used to reject heat from the vehicle air conditioning system to which condenser 88 is coupled. Further still, the airflow may be used to increase the performance of a turbocharged/supercharged engine that is equipped with intercoolers that reduce the temperature of the air that goes into an intake manifold of the engine. While this embodiment depicts one cooling fan, other examples may use more than one cooling fan.

System voltage from the system battery 58 may also be used to operate other vehicle components such as an entertainment system (radio, speakers, etc.), electrical heaters, windshield wiper motors, a rear window defrosting system, and headlights.

FIG. 1 further shows a control system 14. Control system 14 may be communicatively coupled to various components of engine 10 to carry out the control routines and actions described herein. For example, as shown in FIG. 1, control system 14 may include controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 16, which may include user inputs and/or sensors (such as transmission gear position, gas pedal input, brake input, transmission selector position, vehicle speed, engine speed, engine temperature, ambient temperature, intake air temperature, etc.), cooling system sensors (such as coolant temperature, fan speed, passenger compartment temperature, ambient humidity, etc.), and others (such as Hall Effect current sensors from the alternator and battery, a system voltage regulator, etc.). Further, controller 12 may communicate with various actuators 18, which may include engine actuators (such as fuel injectors, an electronically controlled intake air throttle plate, spark plugs, etc.), cooling system actuators (such as motor actuators, motor circuit relays, etc.), and others. As an example, controller 12 may send a signal to an actuator of clutch 56 to engage or disengage the clutch, so as to connect or disconnect the crankshaft of engine 10 from transmission 54 and the components connected thereto. In some examples, the storage medium may be programmed with computer readable data representing instructions executable by the processor for performing the methods described below as well as other variants that are anticipated but not specifically listed.

As described above, air flow through a front end compartment of a vehicle may aid in cooling various vehicle components. The cooling air flow, whether enhanced by a cooling fan, such as the cooling fan 91 of FIG. 1, or directly channeled to heat exchangers, arranged upstream of the components, from air surrounding the vehicle, may be guided by grilles. The grilles may be disposed in a front end of the vehicle in addition to a central grille adjacent to a radiator, such as the grille 112 and radiator 80 of FIG. 1. As an example, a front fascia of the vehicle may have a plurality of grilles to generate a desired amount of air flow through the front end compartment and under a body of the vehicle, as depicted in FIG. 2.

FIG. 2 shows an example of a vehicle 202 from a perspective view 200, which may be a non-limiting example of the vehicle 102 of FIG. 1. A set of reference axes 201 are provided for comparison between views, indicating a y-axis, an x-axis, and a z-axis. In some examples, the y-axis may be parallel with a direction of gravity. The vehicle 202 has a front end 204 with a plurality of grilles included in cooling assemblies of the vehicle 202. The cooling assemblies may further include heat exchangers, ducts, and mounting hardware (not shown in FIG. 2). For example, the plurality of grilles may include a first grille 206 disposed in a hood 208 of the vehicle 202, a second grille 210 positioned in a central region of a front fascia 212 of the vehicle 202, and a set of side grilles 214 arranged on either side of the second grille 210 along the front fascia 212. Each side grille of the set of side grilles 214 may be positioned in front of and upstream of wheels 216 of the vehicle 202. Air entering the set of side grilles 214, as indicated by arrows 218, as the vehicle is moving forwards, as indicated by arrow 220, flows through ducts which couple the set of side grilles 214 to the heat exchangers, or coolers. The coolers may circulate a coolant through cooling channels of the coolers. For example, the coolers may be coupled to an engine cooling system of the vehicle, a same coolant that circulates between an engine and a radiator to cool the engine.

The coolant may absorb heat from the air passing across fins of the coolers, where the cooling channels extend through the fins. The air is thus cooled upon passing through the cooler and proceeding to flow through vents in wheel liners arranged between the set of side grilles 214 and the wheels 216. Upon flowing through the vents, the air flows across the wheels 216, allowing brakes coupled to the wheels 216 to be cooled.

The first grille 206 may be similarly coupled to a cooler by a duct to cool air via the cooler prior to the air coming into contact with another vehicle component, such as a transmission. It will be appreciated that other examples may include various quantities of cooling assemblies arranged in various configurations in the vehicle without departing from a scope of the present disclosure.

Implementing a vehicle with the cooling assemblies may assist in channeling air flow to the coolers and cooled air to specific vehicle components. However, an incorporation of the plurality of grilles, the ducts and the coolers, as well as mounting hardware to secure the coolers to the vehicle, results in a large number of individual parts forming the cooling assemblies. A manufacturing cost may be driven undesirably high due to the number of parts and resultant complexity of the cooling assemblies. Also, assembly of individual parts of the cooling assemblies may introduce small separations between the parts. For example, small gaps may be present between a grille and a duct and/or between the duct and a cooler along joints or seams between the components. The gaps allow air to be diverted away from a cooling assembly, therefore decreasing a cooling efficiency of the cooling assembly.

Another issue includes a geometry of the cooling assembly. Use of conventional manufacturing techniques to fabricate the cooler results in a rectangular shape of the cooler. The rectangular shape, however, may not be well-adapted to a region of the vehicle in which the cooler is positioned. Additionally, the rectangular geometry may result in dead zones, such as at corners of the cooler, where air flow is reduced relative to a central region of the cooler. A size of the cooler may be increased, in some instances, to compensate for the dead zones, which may not be desirable in vehicles with little leeway in available packaging space.

Furthermore, the rectangular shape of the cooler may demand large dimensions of the grille to ensure delivery of sufficient air flow. Large grilles in a front end of the vehicle may lead to increased lift and drag coefficient when the vehicle is moving, adversely affecting vehicle performance, particularly in racing vehicles. In addition, while the grilles may be coupled to the coolers by ducts which guide air flow to the coolers, the coolers are not coupled to the downstream vehicle component with ducts. Thus, flowing through the coolers may be easily diverted away from the vehicle component, reducing a cooling efficiency of the cooling assembly.

The issues described above may be at least partially addressed by fabricating a cooling assembly as a single, continuous unit, without seams. For example, a grille, an inlet duct, a cooler, and an outlet duct may be integrated into the continuous cooling assembly as well as brackets for mounting the cooling assembly. The continuous cooling assembly may be fabricated by an additive manufacturing process, such as 3D printing. In comparison to conventional methods of the individual parts of the continuous cooling assembly, additive manufacturing may allow the continuous cooling assembly to be formed with smooth walls and fewer joints. Less material is wasted during the manufacturing process and production labor is comparatively decreased, thereby reducing costs. As well, 3D printing of the cooling assembly may allow alternate lightweight materials to be used that may be difficult to employ in conventional processing methods, such as low-density aluminum alloys.

Forming the cooling assembly via 3D printing allows a geometry of the cooler to be optimized to eliminate dead zones and enhance efficiency. A geometry of the inlet and outlet ducts may be configured to match the cooler, reducing air flow diversion and loss. By increasing an efficiency of the cooler, a size of the cooler may be decreased, resulting in a corresponding decrease in a size of the grille. The reduced dimensions of the grille may lead to decreased vehicle lift and a lower coefficient of drag.

A schematic example of a continuous cooling assembly 302 is shown in FIG. 3 in a perspective view 300 and in FIG. 4 in a cross-section 400. In some examples, the continuous cooling assembly 302 may be the continuous cooling assemblies 110 of FIG. 1. Arrow 304 indicates a forward direction and arrow 306 indicates a backwards direction, with respect to a vehicle that the continuous cooling assembly 302 may be arranged in. The continuous cooling assembly 302 includes, from a front to a back of the continuous cooling assembly 302, a grille 308, an inlet duct 310, a cooler 312, and an outlet duct 314. Each component of the continuous cooling assembly 302 may merge seamlessly and uninterruptedly into one or more adjacent components. It will be appreciated that the continuous cooling assembly 302 is shown in FIG. 3 with a rectangular geometry for simplicity but when implemented, may have a variety of geometries.

The grille 308 may be positioned in a front end of a vehicle, as shown in FIG. 2. For example, the grille 308 may be any of the first grille 206, the second grille 210, or the set of side grilles 214 of FIG. 2. The grille 308 may be a layer of mesh extending entirely across a front of the continuous cooling assembly 302 and may be configured to couple to a bezel or frame disposed in a front region of the vehicle, such as a front fascia. The inlet duct 310 is positioned behind the grille 308 and extends between the grille 308 and the cooler 312 along the z-axis. The inlet duct 310 may guide incoming air, entering through the mesh of the grille 308 to flow across fins of the cooler 312, each fin coupled to a cooling channel. The inlet duct 310 may be a hollow chamber or passage that funnels air to the cooler 312 without disrupting or decreasing the flow of air.

Figure 5:
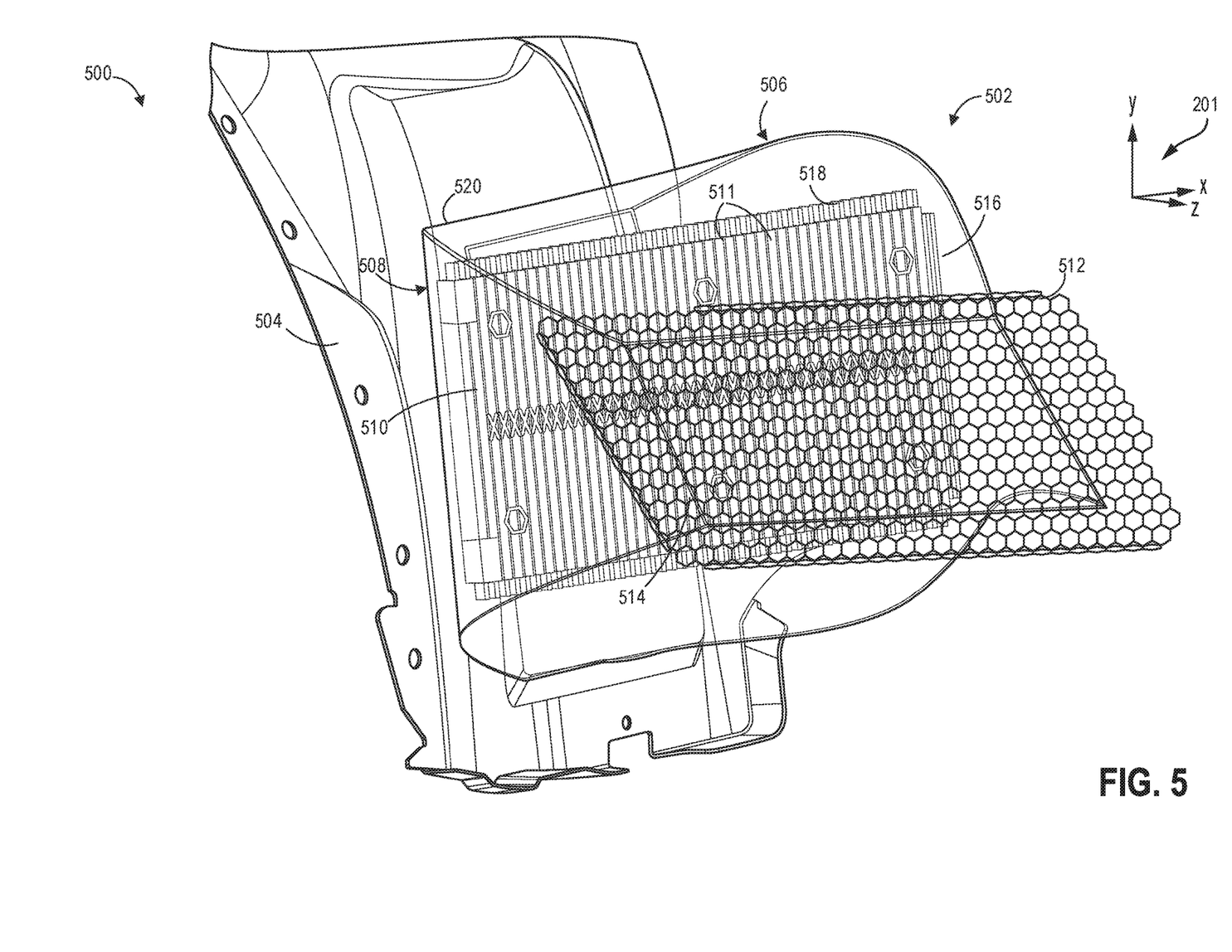
FIG. 5 shows a second example of a continuous cooling assembly from a first view.

The inlet duct 310 may be continuous with both the grille 308 and the cooler 312 and may have a geometry similar to an outer geometry of the cooler 312 at an end of the inlet duct 310 coupled to the cooler 312. For example, a cross-section of the inlet duct 310, taken along the x-y plane adjacent to the cooler 312, may be have a similar outer shape as a cross-section of the cooler 312, also taken along the x-y plane. The cooler 312 may have fins and cooling channels aligned with either the y-axis (as shown in FIG. 5) or the x-axis. Coolant flow through the cooling channels of the cooler 312 and the fins guide air flow across surfaces of the cooling channels so that the coolant absorbs heat from the air passing over. Cooled air passing across the cooling channels of the cooler 312 flows into the outlet duct 314.

The outlet duct 314 may be similar to the inlet duct 310, e.g., configured as a hollow chamber or passage that has a similar outer geometry as the cooler 312 at an end of the outlet duct 314 coupled to the cooler 312. The outlet duct 314 extends from a rear side (e.g. relative to arrow 306) of the cooler 312 along the z-axis and may interface with a vehicle component to be cooled. For example, when the continuous cooling assembly 302 is arranged in the front fascia of the vehicle in front of wheel, such as shown in FIG. 2 by the set of side grilles 214, the outlet duct 314 may channel cooled air from the cooler 312 to a wheel liner arranged in front of and directly adjacent to the wheel. The outlet duct 314 thereby expedites flow of cooled air to the wheel by providing a closed flow path from the cooler 312 to the wheel liner that reduces loss of air due to turbulence and convection that would otherwise divert the air flow without the presence of the outlet duct 314.

The continuous cooling assembly 302 may have a plurality of integrated brackets. For example, the plurality of integrated brackets may include a cooler bracket 402, as shown in the cross-section 400 of FIG. 4. The cooler bracket 402 extends downwards, relative to the y-axis, from a bottom surface 404 of the cooler 312. The cooler bracket 402 may have a variety of shapes configured to interface with a supporting structure in the vehicle to secure a position of the cooler 312, for example, behind the front fascia of the vehicle and in front of the wheel liner.

The plurality of integrated brackets may also include mounting brackets 316 coupled to the inlet duct, as shown in FIGS. 3 and 4. The mounting brackets 316 may be attached to a top surface 318 and a bottom surface 320 of the outlet duct 314 and protrude outwards, away from the outlet duct 314. The outlet duct 314 may be connected to a vehicle component, such as the wheel liner for example, by the mounting brackets 316. While the mounting brackets 316 are shown in FIG. 3 as L-shaped structure, the mounting brackets 316 may have various other geometries in other examples. It will be appreciated that the mounting brackets 316 and the cooler bracket 402 are non-limiting examples and other examples of the continuous cooling assembly 302 may have other quantities of integrated brackets arranged in a variety of configurations. For example, brackets may protrude from side surfaces (e.g., surfaces parallel with the y-axis) of the outlet duct 314, the cooler bracket 402 may be coupled to other surfaces of the cooler 312, such as a top or sides of the cooler 312, or the cooler 312 may have more than one bracket. As another example, integrated brackets may be arranged on other components of the continuous cooling assembly 302, such as along surfaces of the inlet duct 310 or edges of the grille 308. By additively manufacturing the continuous cooling assembly 302, a geometry of the assembly may be adjusted according to a region of the vehicle to in which the continuous cooling assembly 302 is to be positioned. An outer shape, a length of each component, the length define along the z-axis, a configuration of brackets, etc. may be customized to the specific region so that cooling of the corresponding vehicle component is enhanced.

Furthermore, integrating the grille, the ducts, and the cooler of the continuous cooling assembly into a single continuous unit eliminates fastening hardware for coupling the components of the continuous cooling assembly to one another. For example, in conventional cooling assemblies, bolts, nuts, and other fastening devices may be used to attach the grille to the inlet duct and the inlet duct to the cooler. Precluding these devices simplifies the cooling assembly and reduces both a weight and a cost of the assembly. In addition, the additively manufactured continuous cooling assembly may be readily adaptable to any region of the vehicle and may enable simplification of structures to be coupled to the continuous cooling assembly, such as wheel liners of the vehicle.

Figure 6:
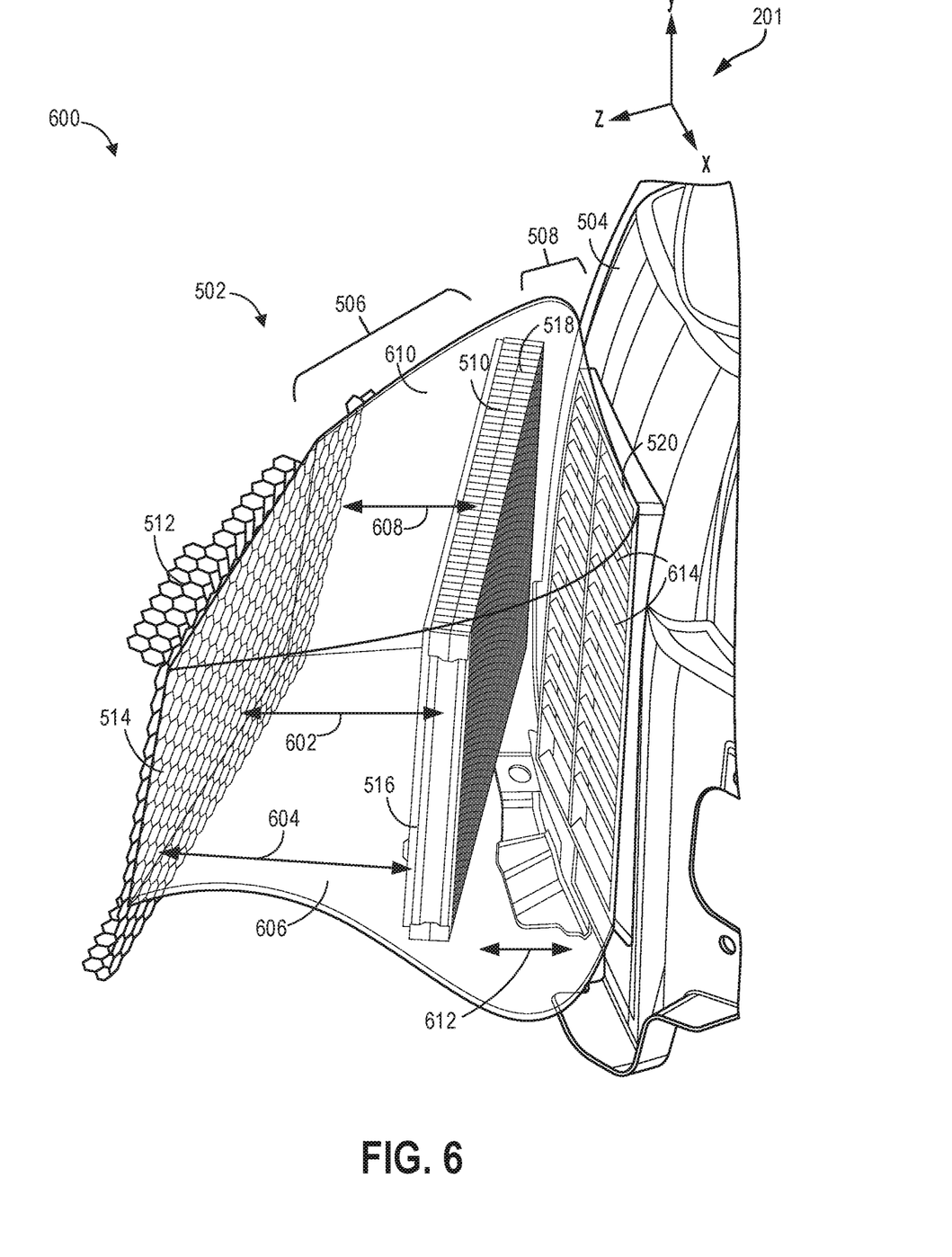
FIG. 6 shows the second example of the continuous cooling assembly from a second view.
Figure 7:
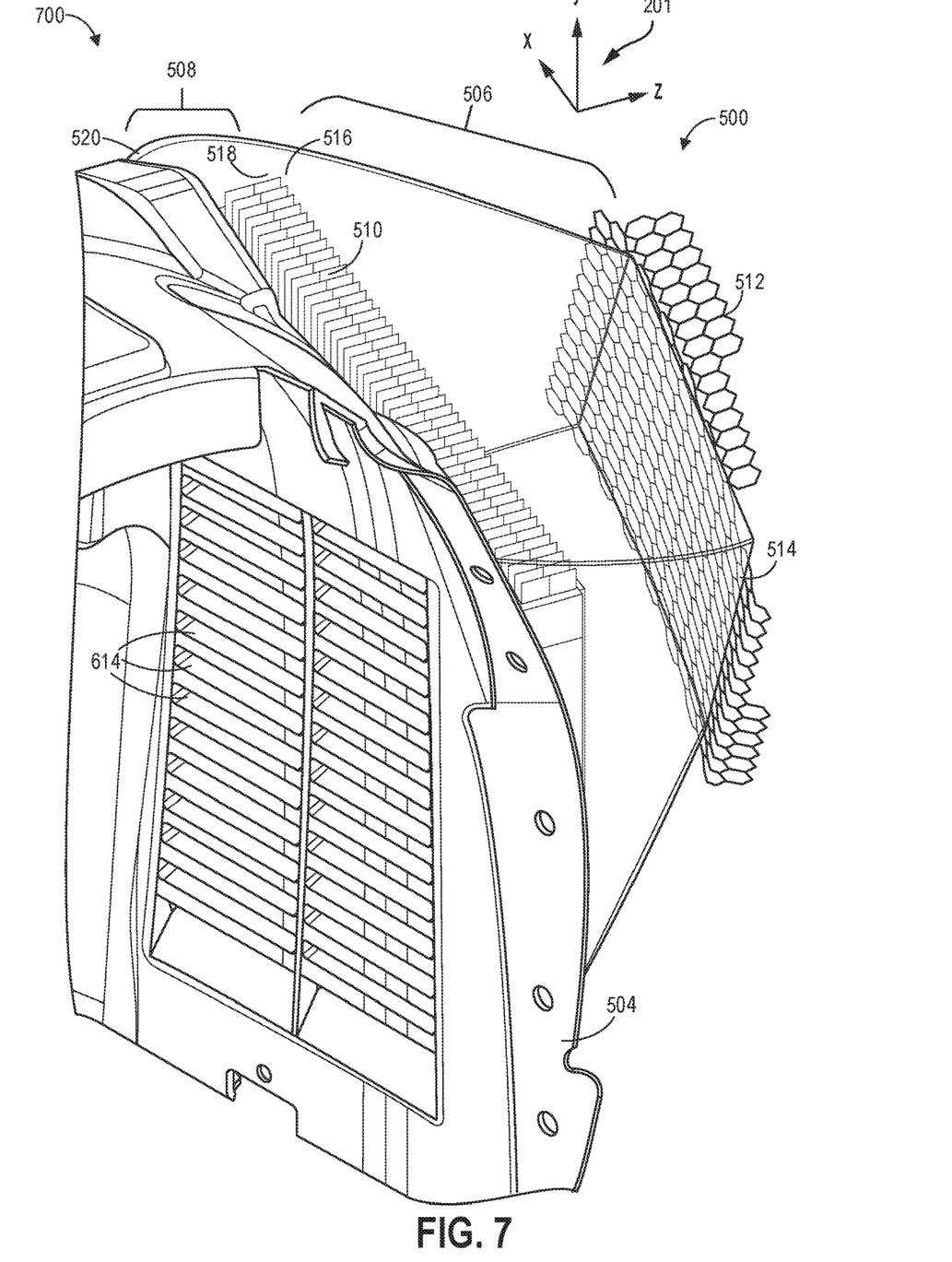
FIG. 7 shows the second example of the continuous cooling assembly from a third view.
Figure 8:
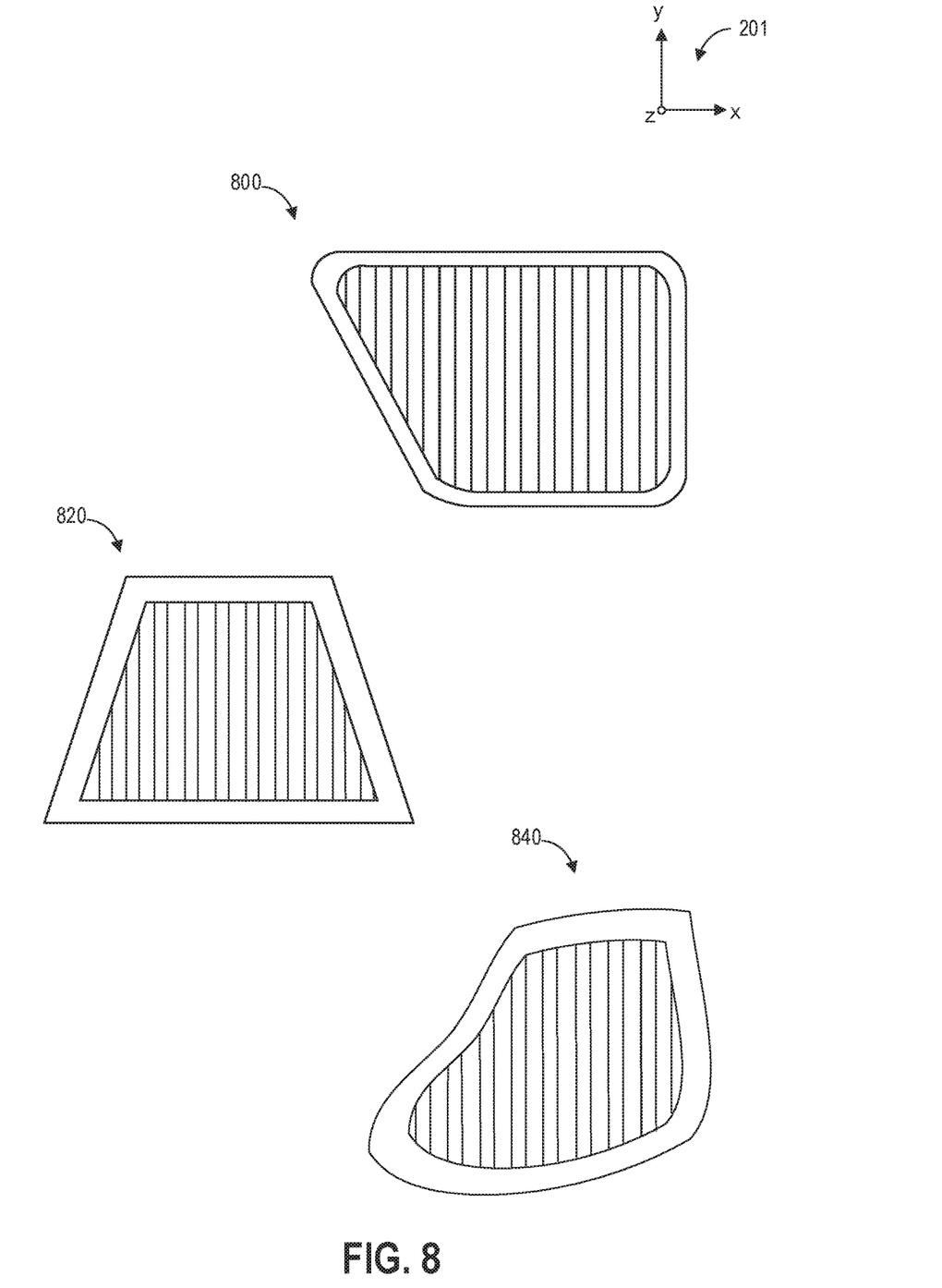
FIG. 8 shows examples of non-rectangular geometries that may be adopted by a cooler of a continuous cooling assembly.

A second example of a continuous cooling assembly 502 is shown coupled to a wheel liner 504 in FIGS. 5-7 from different perspectives. A first view 500, a second view 600, and a third view 700 of the continuous cooling assembly 502 are depicted in FIGS. 5-7 respectively and will be described collectively. The continuous cooling assembly 502 may be a non-limiting example of the continuous cooling assembly 302 of FIGS. 3-4, configured to be arranged in front of a wheel of a vehicle, as shown by the set of side grilles 214 of FIG. 2, and attached to the wheel liner 504 by mounting brackets, such as the mounting brackets 316 shown in FIGS. 3-4. The mounting brackets are not shown in FIGS. 5-7 for brevity and an inlet duct 506 and an outlet duct 508 of the continuous cooling assembly 502 are depicted as transparent in FIGS. 5-7 to show details of a cooler 510 of the continuous cooling assembly 502.

As described above, the continuous cooling assembly 502 may have a grille 512 arranged along an exterior surface of the vehicle to allow incoming air to enter the continuous cooling assembly 502 through a mesh of the grille 512. The grille 512 is shown with a rectangular geometry but may have any geometry that matches an opening in the exterior surface of the vehicle. The grill 512 may be continuously coupled, e.g., attached without any additional hardware, to a first, upstream end 514 of the inlet duct 506. The first end 514 of the inlet duct 506 may have an outer geometry that matches the geometry of the grille 512. For example, the first end 514 of the inlet duct 506 may be rectangular with similar dimensions (e.g., a height along the y-axis and a width along the x-axis) to the grille 512 or smaller dimensions than the grille 512.

The geometry of the grille 512 may not be uniform along a length 602 of the inlet duct 506, as shown in FIG. 6. Surfaces of the inlet duct 506 may be curved and/or angled relative to the z-axis so that the outer geometry inlet duct 506 transitions from being similar to the geometry of the grille 512 to being similar to the geometry of the cooler 510. For example, a length 604 of a first side surface 606 of the inlet duct 506 may be longer than a length 608 of a second side surface 610 of the inlet duct 506, as shown in FIG. 6, due to a curving of the inlet duct 506 along the z-axis. Furthermore, a cross-section of the inlet duct 506 taken along the x-y plane may have an asymmetric, irregular outer geometry.

A second, downstream end 516 of the inlet duct 506 may couple to the cooler 510 and surround outer surfaces of the cooler 510. In other words, the cooler 510 is arranged inside of the second end 516 of the inlet duct 506 and may be continuously coupled to an inner surface of the inlet duct 506 at the second end 516 of the inlet duct 506. In addition, the second end 516 of the inlet duct 506 may be seamlessly and continuously coupled to a first, upstream end 518 of the outlet duct 508. As an example, the inlet duct 506 and the outlet duct 508 may together form a continuous duct with the cooler 510 positioned inside of the continuous duct and coupled to an inner surface of the continuous duct. The first end 518 of the outlet duct 508 may also surround the outer surfaces of the cooler 510, merging uninterruptedly with the second end 516 of the inlet duct 506 around the cooler 510. The first end 518 of the outlet duct 508 may have an outer geometry similar to the outer geometry of the cooler 510.

The cooler 510 may be coupled to inner surfaces of the inlet duct 506, at the second end 516, and inner surface of the outlet duct 508, at the first end 518, so that air may not flow between the inner surfaces of the ducts and outer edges of the cooler 510. In other words, the continuous cooling assembly 502 may be manufactured so that the outer edges of the cooler 510 merges with the inner surface of the ducts without any gaps or spaces. In this way, air flowing through the inlet duct 506 is forced to flow through the cooler 510 and not around the cooler 510, which increases a cooling efficiency of the continuous cooling assembly 502.

As described above, the cooler 510 is depicted with a rectangular geometry in FIGS. 5-7 for simplicity but may have a non-rectangular shape to increase a cooling efficiency of the cooler 510. For example, as shown in FIG. 8, the cooler 510 may have an outer geometry similar to any of a first cooler 800, a second cooler 820, or a third cooler 840, with a symmetric (e.g., mirror-symmetric across the y-z plane) or asymmetric outer shape with angular or curved corners. In some examples, the cooler 510 may not have corners. The cooler 510 may have curved or straight sides and/or non-uniform heights and widths. In other words, the cooler 510 may have any shape that may be produced via additive manufacturing.

The cooler 510 has a plurality of fins 511, as shown in FIG. 5, arranged parallel with the y-axis and extending across an entire height, the height defined along the y-axis, of the cooler 510. The plurality of fins 511 may be shaped to guide air flow through gaps between the plurality of fins 511 to contact a plurality of cooling channels (not shown in FIGS. 5-7) positioned behind the plurality of fins 511. As an example, the plurality of fins may be angled or have a tapered cross-section along the x-z plane.

The plurality of cooling channels may be arranged parallel with or perpendicular to the plurality of fins 511, e.g., aligned with the y-axis or with the x-axis. The cooler 510 may have an inlet and outlet fluidly coupling the plurality of cooling channels to coolant circuit of the vehicle to circulate coolant through the plurality of cooling channels. The coolant flowing through the cooling channels absorbs heat from incoming air, thereby cooling the air so that a temperature of the air in the inlet duct 506 is lower than a temperature of the air in the outlet duct 508.

In FIGS. 5-7, the length 602 of the inlet duct 506 is greater than a length 612 of the outlet duct 508, as shown in FIG. 6. However, in other examples, the relative lengths of the inlet duct 506 and the outlet duct 508 may differ. For example, the inlet duct 506 may be longer relative to the outlet duct 508 than shown in FIGS. 5-7 or, alternatively, may be shorter than the outlet duct 508. The relative lengths of the ducts may be adjusted according to available packaging space in the vehicle, a desired location of the cooler 510, a desired flow path length or shape of the outlet duct 508 to mitigate warming of the air, etc.

The outlet duct 508 extends between the cooler 510 and the wheel liner 504. An outer geometry of the outlet duct 508, may not be uniform along the length 612 of the outlet duct 508, similar to the inlet duct 506. For example, the outlet duct 508 may curve along the z-axis, have surfaces of different lengths and curvatures, and transition from having a geometry similar to the cooler 510 at the first end 518 of the outlet duct 508 to having a geometry adapted to couple to the wheel liner 504 at a second, downstream end 520 of the outlet duct 508.

The second end 520 of the outlet duct 508 may interface with a region of the wheel liner 504 adapted with vents 614, as shown in FIGS. 6 and 7. The vents 614 are uniform, rectangular openings, e.g., slots, in the wheel liner allowing cooled air to flow from the outlet duct 508 through the wheel liner 504 and to a wheel positioned adjacent to and downstream of the wheel liner 504. In other words, the vents 614 may be flow-guiding regions of the wheel liner 504, configured to direct flow of cooled air to a downstream vehicle component. In one example, the vents 614 may be arranged to form a rectangular region in the wheel liner 504 and the second end 520 of the outlet duct 508 may be shaped to surround the rectangular region when interfacing with the wheel liner 504.

By adapting the continuous cooling assembly 502 with the outlet duct 508, a configuration of the vents 614, may be simplified. For example, the vents 614 may be concentrated within a region of the wheel liner 504 corresponding to an area surrounded by the second end 520 of the outlet duct 508. In contrast, if the outlet duct 508 is not present, more vents 614 may be disposed in the wheel liner 504 to compensate for loss of air flow to the wheel resulting from diversion of air away from the wheel liner 504. In other words, air may flow outwards, away from the wheel liner 504 in a region between the cooler 510 and the wheel liner 504 when the outlet duct 508 is not implemented. Furthermore, a geometry of each of the vents 614 may be more complex when the outlet duct 508 is not present to guide and direct air flow to the wheel. Each of the vents 614 may have a more complicated shape, be angled differently according to a relative orientation of one of the vents 614 to the wheel, and/or have non-uniform dimensions.

Each component, e.g., the grille 512, the inlet duct 506, the cooler 510, the outlet duct 508, and mounting brackets, of the continuous cooling assembly 502 may be formed from a same material, such as an aluminum alloy. Additive manufacturing of the continuous cooling assembly 502 enables the components to be fabricated concurrently, thereby optimizing geometries of the components relative to one another to minimize leakage resulting in loss of efficiency. By increasing a cooling efficiency of the continuous cooling assembly 502, an overall size of the continuous cooling assembly 502 may be decreased.

In this way, a cooling assembly for a vehicle may provide cooling air flow to components of the vehicle subjected to high temperatures. The cooling assembly may be formed by additive manufacturing as a single continuous unit that incorporates a grille, a heat exchanger or cooler, an inlet duct extending between the grille and the cooler, and an outlet duct extending between the cooler and a downstream vehicle component, as well as brackets for mounting the cooling assembly. By implementing the cooling assembly as a single unit, geometries of each component of the cooling assembly may be optimized to interface with adjacent components, increasing a cooling efficiency of the cooling assembly and precluding use of fasteners to couple the components to one another. Dimensions and a shape of each component of the cooling assembly may be customized according to available packaging space in a region of the vehicle in which the cooling assembly is to be located, which further increases the efficiency of the cooling assembly. The additively manufactured cooling assembly may have a reduced size and weight relative to conventional cooling assemblies, thereby reducing costs and increasing a fuel economy of the vehicle. The reduced size decreases lift and drag experienced by the vehicle when the vehicle is moving.

The technical effect of implementing a continuous cooling assembly in a vehicle is that vehicle components are cooled more efficiently without imposing additional resistance to vehicle motion, thereby increasing a useful lifetime of the components and vehicle performance.

In one embodiment, a cooling assembly includes a non-rectangular cooler positioned in a front end of the vehicle, an entry duct continuous with the non-rectangular cooler and arranged upstream of the non-rectangular cooler, and an exit duct also continuous with the non-rectangular cooler and arranged downstream of the non-rectangular cooler, wherein the non-rectangular cooler, the entry duct, and the exit duct form a continuous monolithic structure. In a first example of the cooling assembly, a grille is arranged at an exterior surface of the vehicle and positioned in front of and continuous with the entry duct. A second example of the cooling assembly optionally includes the first example, and further includes, wherein air enters the cooling assembly through a mesh of the grille and is guided by the entry duct to the non-rectangular cooler. A third example of the cooling assembly optionally includes one or more of the first and second examples, and further includes, wherein air flows out of the cooling assembly through the exit duct and wherein air in the entry duct has a higher temperature than air in the exit duct. A fourth example of the cooling assembly optionally includes one or more of the first through third examples, and further includes an outer geometry of a first, upstream end of the entry duct configured to match an outer geometry of the grille and an outer geometry of a second, downstream end of the entry duct configured to match an outer geometry of the non-rectangular cooler. A fifth example of the cooling assembly optionally includes one or more of the first through fourth examples, and further includes an outer geometry of a first, upstream end of the exit duct configured to match an outer geometry of the non-rectangular cooler and an outer geometry of a second, downstream end of the exit duct configured to match a geometry of a flow-guiding region of a vehicle component arranged downstream of the exit duct. A sixth example of the cooling assembly optionally includes one or more of the first through fifth examples, and further includes wherein the entry duct is continuous with the exit duct, together forming a single, seamless duct and wherein outer edges of the non-rectangular cooler are integrated into an inner surface of the single, seamless duct.

In another embodiment, a continuous cooling unit includes a heat exchanger with a first integrated duct, extending between the heat exchanger and a grille positioned upstream of the heat exchanger, and a second integrated duct, extending between the heat exchanger and a vehicle component positioned downstream of the heat exchanger, and wherein the grille, the heat exchanger, the first duct, and the second duct form a single continuous, seamless structure. In a first example of the cooling unit, an outer geometry of the heat exchanger is configured to match a space in a vehicle upstream of a vehicle component to be cooled by air flowing from the heat exchanger. A second example of the cooling unit optionally includes the first example and further includes a set of mounting brackets protruding from an outer surface of the second duct and continuous with the outer surface of the second duct. A third example of the cooling unit optionally includes one or more of the first and second examples, and further includes, a bracket protruding from a bottom surface of the heat exchanger and continuous with the bottom surface of the heat exchanger. A fourth example of the cooling unit optionally includes one or more of the first through third examples, and further includes, wherein a downstream end of the first duct merges with an upstream end of the second duct at the heat exchanger. A fifth example of the cooling unit optionally includes one or more of the first through fourth examples, and further includes, wherein inner surfaces of the first duct and the second duct are in continuous contact with outer edges of the heat exchanger and air does not flow between the inner surfaces of the ducts and the outer edges of the heat exchanger. A sixth example of the cooling unit optionally includes one or more of the first through fifth examples, and further includes, wherein the grille, the heat exchanger, the first duct, and the second duct are coupled to one another without fastening devices to form the single continuous structure. A seventh example of the cooling unit optionally includes one or more of the first through sixth examples, and further includes, wherein the vehicle component downstream of the heat exchanger is a wheel liner with a plurality of vents concentrated in a region of the wheel liner and wherein a downstream end of the second duct is configured to surround the region with the plurality of vents. An eighth example of the cooling unit optionally includes one or more of the first through seventh examples, and further includes, wherein the wheel liner is positioned upstream of a vehicle wheel and air flowing out of the second duct flows through the plurality of vents to the vehicle wheel.

In another embodiment, a cooling system includes a vehicle component, a continuous cooling assembly arranged in front of the vehicle component, the continuous cooling assembly configured as a single seamless, continuous unit and including, a grille, a non-rectangular cooler positioned behind the grille, a first duct extending between the grille and the non-rectangular cooler, and a second duct extending from the non-rectangular cooler to the vehicle component. In a first example of the cooling system, air flows into the cooling system through the grille with a first temperature and flows out of the cooling system to the vehicle component through the second duct with a second temperature, the second temperature lower than the first temperature. A second example of the cooling system optionally includes the first example, and further includes, wherein the continuous cooling assembly is additively manufactured. A third example of the cooling system optionally includes one or more of the first and second examples, and further includes, outer geometries of each of the grille, the non-rectangular cooler, the first duct, and the second duct configured to match a geometry of a region of the vehicle in which each of the grille, the non-rectangular cooler, the first duct, and the second duct is positioned.

In another representation a cooling system for a vehicle, includes an additively manufactured cooling assembly including a grille configured to receive intake air, a non-rectangular cooler coupled to the grille by a first duct, the first duct continuous with both the grille and the non-rectangular cooler, and a second duct extending from the non-rectangular cooler in a opposite direction from the first duct, the second duct continuous with the non-rectangular cooler.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cooling assembly for a vehicle, comprising:
a non-rectangular cooler positioned in a front end of the vehicle;
an entry duct continuous with the non-rectangular cooler and arranged upstream of the non-rectangular cooler; and
an exit duct also continuous with the non-rectangular cooler and arranged downstream of the non-rectangular cooler, wherein a 3D printed continuous monolithic structure comprises the non-rectangular cooler, the entry duct, and the exit duct 3D printed together without seams,
wherein the 3D printed continuous monolithic structure is attached to a wheel liner of a wheel via mounting brackets, the 3D printed continuous monolithic structure positioned upstream of the wheel,
wherein the 3D printed continuous monolithic structure is outside an engine of the vehicle and upstream the engine of the vehicle,
wherein a first side surface length of the entry duct is shorter than a second side surface length of the entry duct,
wherein the first side surface length extends from a top of an inlet end of the entry duct to the non-rectangular cooler, and wherein the second side surface length extends from a bottom of the inlet end of the entry duct to the non-rectangular cooler,
wherein the inlet end of the entry duct is rectangular, and
wherein a cross-section of the entry duct taken between the inlet end of the entry duct and a downstream end of the entry duct has an asymmetric and irregular outer geometry along an x-y plane.

2. The cooling assembly of claim 1, further comprising a grille arranged at an exterior surface of the vehicle and positioned in front of and continuous with the entry duct, wherein the grille is positioned at an angle such that a top edge of the grille is closer to the non-rectangular cooler than a bottom edge of the grille, and wherein the vehicle is a road automobile.

3. The cooling assembly of claim 2, wherein an outer geometry of the downstream end of the entry duct is configured to match an outer geometry of the non-rectangular cooler.

4. The cooling assembly of claim 2, further comprising an outer geometry of a first, upstream end of the exit duct configured to match an outer geometry of the non-rectangular cooler and an outer geometry of a second, downstream end of the exit duct configured to match a geometry of a flow-guiding region of a vehicle component arranged downstream of the exit duct.

5. The cooling assembly of claim 1, wherein the entry duct is continuous with the exit duct, together forming a single, seamless duct and wherein outer edges of the non-rectangular cooler merge with and are integrated into an inner surface of the single, seamless duct.

6. The cooling assembly of claim 1, wherein surfaces of the entry duct are angled and/or curved along a z-axis.

7. The cooling assembly of claim 1, wherein the inlet end of the entry duct is rectangular along the x-y plane.

8. A continuous cooling unit, comprising:
a heat exchanger of a vehicle with a first integrated duct, extending between the heat exchanger and a grille positioned upstream of the heat exchanger, and a second integrated duct, extending between the heat exchanger and a vehicle component positioned downstream of the heat exchanger, and wherein a single continuous, 3D printed seamless structure comprises the grille, the heat exchanger, the first integrated duct, and the second integrated duct 3D printed together to form the single continuous, 3D printed seamless structure,
wherein the single continuous, 3D printed seamless structure is attached to a wheel liner of a wheel via mounting brackets, and wherein the single continuous, 3D printed seamless structure is positioned upstream of the wheel, and wherein the single continuous, 3D printed seamless structure is outside an engine of the vehicle and upstream the engine of the vehicle,
wherein a first side surface length of the first integrated duct is shorter than a second side surface length of the first integrated duct,
wherein the first side surface length extends from a top of an inlet end of the first integrated duct to the heat exchanger, and wherein the second side surface length extends from a bottom of the inlet end of the first integrated duct to the heat exchanger,
wherein the inlet end of the first integrated duct is rectangular, and
wherein a cross-section of the first integrated duct taken between the inlet end of the first integrated duct and a downstream end of the first integrated duct has an asymmetric and irregular outer geometry along an x-y plane.

9. The continuous cooling unit of claim 8, further comprising an outer geometry of the heat exchanger configured to match a space in the vehicle upstream of the vehicle component to be cooled by air flowing from the heat exchanger.

10. The continuous cooling unit of claim 8, wherein the mounting brackets are a set of mounting brackets protruding from an outer surface of the second integrated duct and continuous with the outer surface of the second integrated duct.

11. The continuous cooling unit of claim 8, wherein the grille, the heat exchanger, the first integrated duct, and the second integrated duct are formed from a same material.

12. The continuous cooling unit of claim 8, wherein the downstream end of the first integrated duct merges with an upstream end of the second integrated duct at the heat exchanger.

13. The continuous cooling unit of claim 12, wherein inner surfaces of the first integrated duct and the second integrated duct are in continuous contact with outer edges of the heat exchanger and air does not flow between the inner surfaces of the ducts and the outer edges of the heat exchanger.

14. The continuous cooling unit of claim 8, wherein the grille, the heat exchanger, the first integrated duct, and the second integrated duct are coupled to one another without fastening hardware to form the single continuous, seamless structure.

15. The continuous cooling unit of claim 8, wherein the vehicle component downstream of the heat exchanger is the wheel liner with a plurality of vents concentrated in a region of the wheel liner and wherein a downstream end of the second integrated duct is configured to surround the region with the plurality of vents.

16. The continuous cooling unit of claim 8, wherein the vehicle is a road automobile.

17. A cooling system for a vehicle, comprising:
a vehicle component; and
a continuous cooling assembly arranged in front of the vehicle component, the continuous cooling assembly configured as a single seamless, 3D printed continuous unit including:
  a grille;
  a non-rectangular cooler positioned behind the grille;
  a first duct extending between the grille and the non-rectangular cooler; and
  a second duct extending from the non-rectangular cooler to the vehicle component,
wherein the single seamless, 3D printed continuous unit is attached to a wheel liner of a wheel via mounting brackets, the single seamless, 3D printed continuous unit positioned upstream of the wheel, and wherein the single seamless, 3D printed continuous unit is outside an engine of the vehicle and upstream the engine of the vehicle
wherein a first side surface length of the first duct is shorter than a second side surface length of the first duct,
wherein the first side surface length extends from a top of an inlet end of the first duct to the non-rectangular cooler, and wherein the second side surface length extends from a bottom of the inlet end of the first duct to the non-rectangular cooler,
wherein the inlet end of the first duct is rectangular, and
wherein a cross-section of the first duct taken between the inlet end of the first duct and a downstream end of the first duct has an asymmetric and irregular outer geometry along an x-y plane.

18. The cooling system of claim 17, wherein air flows into the cooling system through the grille with a first temperature and flows out of the cooling system to the vehicle component through the second duct with a second temperature, the second temperature lower than the first temperature.

19. The cooling system of claim 17, wherein the mounting brackets are integrated into the continuous cooling assembly, and wherein the continuous cooling assembly is additively manufactured.

20. The cooling system of claim 17, further comprising outer geometries of each of the grille, the non-rectangular cooler, the first duct, and the second duct configured to match a geometry of a region of the vehicle in which each of the grille, the non- rectangular cooler, the first duct, and the second duct is positioned.

* * * * *